(12) United States Patent
Paquette

(10) Patent No.: US 7,209,146 B2
(45) Date of Patent: *Apr. 24, 2007

(54) METHODS AND APPARATUSES FOR THE AUTOMATED DISPLAY OF VISUAL EFFECTS

(75) Inventor: Michael James Paquette, Bernicia, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/394,733

(22) Filed: Mar. 30, 2006

(65) Prior Publication Data

US 2006/0170702 A1 Aug. 3, 2006

Related U.S. Application Data

(63) Continuation of application No. 10/632,405, filed on Aug. 1, 2003, now Pat. No. 7,042,464.

(51) Int. Cl.
*G09G 5/02* (2006.01)
*G06K 9/00* (2006.01)
*H04N 5/52* (2006.01)
*G03F 1/46* (2006.01)

(52) U.S. Cl. .................. 345/601; 345/589; 348/678; 348/674; 382/167; 358/518; 358/519

(58) Field of Classification Search ........ 348/674–675, 348/576–578, 582, 673; 345/589–593, 597, 345/601, 633, 722, 602–604; 382/162–167; 358/515–520

See application file for complete search history.

(56) References Cited

U.S. PATENT DOCUMENTS

| | | | | |
|---|---|---|---|---|
| 5,227,863 | A * | 7/1993 | Bilbrey et al. | 348/578 |
| 5,648,814 | A * | 7/1997 | Munson | 348/14.1 |
| 6,266,103 | B1 * | 7/2001 | Barton et al. | 348/675 |
| 6,337,923 | B1 * | 1/2002 | Yoon et al. | 382/167 |
| 6,611,260 | B1 * | 8/2003 | Greenberg et al. | 345/204 |
| 6,828,497 | B2 * | 12/2004 | Yataka et al. | 84/625 |
| 7,042,464 | B1 * | 5/2006 | Paquette | 345/601 |
| 7,079,270 | B2 * | 7/2006 | Kiyosu et al. | 358/1.15 |
| 2002/0021360 | A1 * | 2/2002 | Takemoto | 348/222 |
| 2002/0122044 | A1 * | 9/2002 | Deering | 345/597 |
| 2003/0058250 | A1 * | 3/2003 | Adams et al. | 345/589 |
| 2004/0125392 | A1 * | 7/2004 | Ohmori | 358/1.9 |

\* cited by examiner

*Primary Examiner*—Wesner Sajous
(74) *Attorney, Agent, or Firm*—Blakely, Sokoloff, Taylor & Zafman LLP

(57) ABSTRACT

Methods and apparatuses for the generation of visual effects according to the elapsed time for real time display. One embodiment of the present invention provides an automated mechanism for displaying visual effects (e.g., fade to or from a target color) through adjusting color correction parameters (e.g., the look up table for gamma correction) without disturbing display color calibration settings for the current display device. Time-based adjustments are made in small steps in the beginning and end and large steps in the middle of the transition to provide perceptually smooth transition effect. In one embodiment, a operating system resource is provided to manage, synchronously or asynchronously, the visual effect on behalf of requesting applications, simplifying the coding of the application programs and providing consistency across application programs. In one embodiment, the operating system resource uses a reservation system to prevent conflict and interference between application programs.

57 Claims, 8 Drawing Sheets

METHODS AND APPARATUSES FOR THE AUTOMATED DISPLAY OF VISUAL EFFECTS

This application is a continuation application of U.S. patent application Ser. No. 10/632,405, filed Aug. 1, 2003 now U.S. Pat. No. 7,042,464.

FIELD OF THE TECHNOLOGY

The technology field relates to the display of visual effects, and more particular to the generation of visual effects for real time display on a data processing system.

BACKGROUND

Fade transition effects are frequently used to transit from one scene to another. For example, in a video clip (or a motion picture), one scene may fade out through a number of frames to become a picture of a solid color (e.g., black); and, another scene may then fade in from the solid color after a number of frames. Fade effects provide a smooth transition from one scene to another, avoiding abrupt scene changes.

Fade effects are often inserted in video and film media as part of the editing process. A number of frames are generated or modified such that the playback of these frames shows the fade effect. Thus, the fade effect becomes part of the media content after the editing, immutably mixed in with other elements of the media content.

A few games have tried to generate video fade effects in real time, in which a function is called repeatedly to adjust the display gamma table for gamma correction (or a fade interface such as DrawSprocket) in order to produce a fade effect. Such an approach requires a significant effort on the part of the game programmer to coordinate the generation of content and the generation of fade effects. Further, these games iterate over a set of fixed steps without regard to elapsed time.

SUMMARY OF THE DESCRIPTION

Methods and apparatuses for the generation of visual effects according to the elapsed time for real time display are described here. Some of the embodiments of the present invention are summarized in this section.

One embodiment of the present invention provides an automated mechanism for displaying visual effects (e.g., fade to or from a target color) through adjusting color correction parameters (e.g., the look up table (LUT) for gamma correction) without disturbing display color calibration settings for the current display device. Time-based adjustments are made in small steps in the beginning and end and large steps in the middle of the transition to provide a perceptually smooth transition effect. In one embodiment, a operating system resource (which may be considered a part of an operating system software which is executing on a data processing system) is provided to manage, synchronously or asynchronously, the visual effect on behalf of requesting applications which are also executing on the data processing system, simplifying the coding of the application programs and providing consistency across application programs. In one embodiment, the operating system resource uses a reservation system to prevent conflict and interference between application programs.

In one aspect of the present invention, a method to produce visual effect on a display includes: receiving a first time length; and adjusting, according to an elapsed time, color correction parameters a plurality of times during a time period of the first length. In one example, the color correction parameters include parameters in one or more look up tables which are used for gamma correction; and the elapsed time is measured by a real time clock which measures time during production of the visual effect. In one example, the look up table is adjusted to blend input color signals with a color; and, the input color signals are blended with the color according to the elapsed time. In one example, a weight on the color to blend the input color signals with the color changes faster at middle of the time period than at one of: a) beginning of the time period; and b) end of the time period. In one example, the weight is determined from a function (e.g., a sine function) of the elapsed time.

In one example, color correction is performed according to the color correction parameters to generate the visual effect. In one example, adjusting the color correction parameters includes: instructing a graphics processing unit (GPU) to adjust the color correction parameters according to the elapsed time. In one example, a frequency for adjusting the color correction parameters is determined according to a refreshing frequency for displaying, on the display, input color signals corrected by the color correction parameters (e.g., at a frequency that is substantially equal to the refreshing frequency).

In one example, adjusting the color correction parameters includes: determining a first value of the elapsed time; determining first values of the color correction parameters according to the first value of the elapsed time; determining a second value of the elapsed time; and, determining second values of the color correction parameters according to the second value of the elapsed time. In one example, adjusting the color correction parameters is performed by an operating system of a data processing system according to a task scheduler in response to a request from an application program running on the data processing system. In one example, the application program is allowed to execute operations during the time period; in another example, the application program is not allowed to execute operations until the request is fulfilled.

In one example, after the time period, the color correction parameters are restored to values that the color correction parameters have before the time period. In one example, the restoring is performed on expiration of a reservation time period, within which said adjusting the color correction parameters is performed.

In one example, the method to produce visual effect on a display further includes: receiving a second time length from a second application program; and adjusting, according to an elapsed time, the color correction parameters a plurality of times during a time period of the second length in response to a request from the second application program; where the first time length is received from a first application program; and adjusting the color correction parameters during the time period of the first length is in response to a request from the first application program.

In one example, the method to produce visual effect on a display further includes: receiving a request for a reservation from a first application program; and granting a first reservation to the first application program in response to a determination that there is no pending reservation; where the first time length is received from the first application program; and, adjusting the color correction parameters is in response to a request from the first application program that possesses the first reservation. In one example, adjusting the color correction parameters is performed after a determination that the request from the first application program is received within a reservation time period for the first reservation; and upon expiration of the reservation, the color correction parameters are restored to values that the color correction parameters have before the reservation.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

DESCRIPTION OF THE DRAWINGS

The present invention is illustrated by way of example and not limitation in the figures of the accompanying drawings in which like references indicate similar elements.

DETAILED DESCRIPTION

Figure 1:
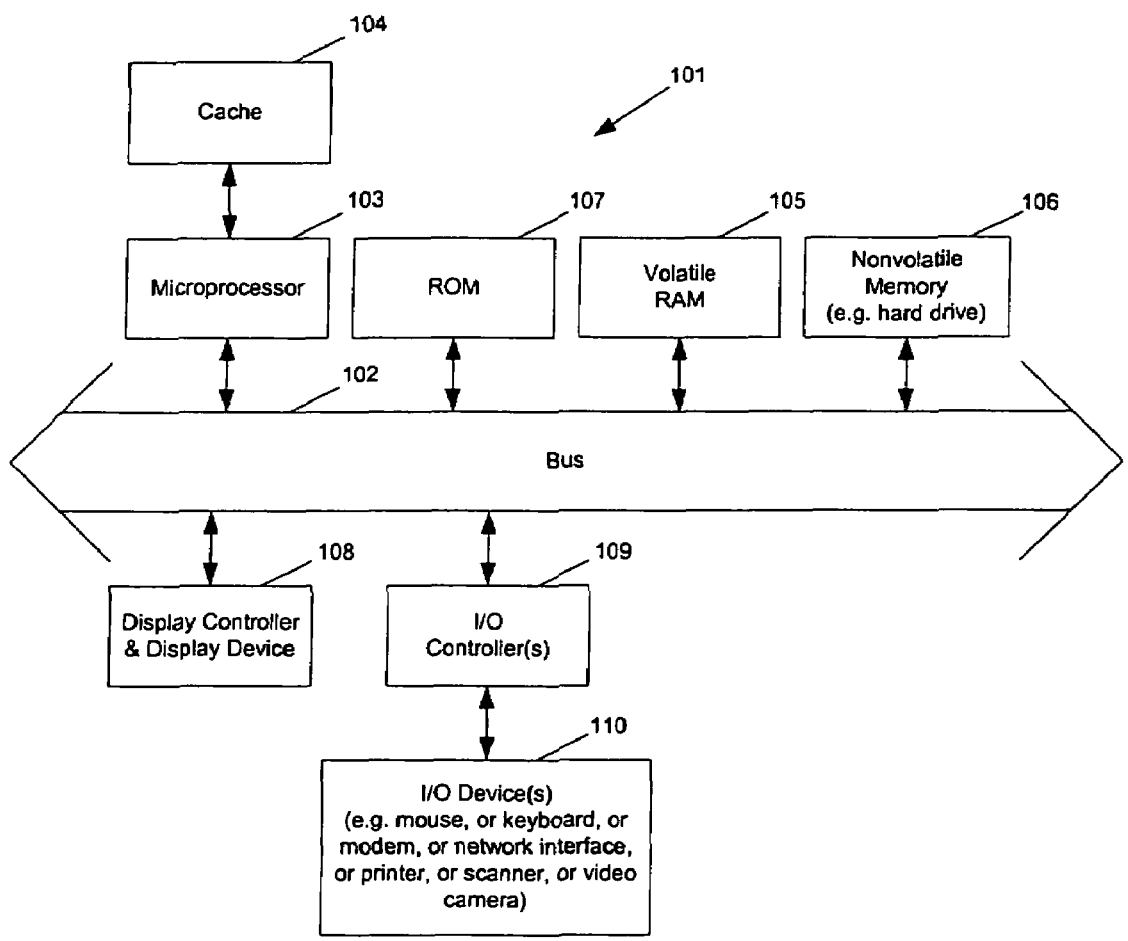
FIG. 1 shows a block diagram example of a data processing system which may be used with the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessary to the same embodiment; and, such references mean at least one.

At least one embodiment of the present invention seeks to provide a simple, consistent, robust and efficient mechanism for applications programs to generate good quality visual effects in real time for display. One embodiment of the present invention provides an automated mechanism for performing display fade transitions through adjusting color correction parameters (e.g., the values of the gamma look up table used by a display controller for performing gamma correction in generating signals to drive a display device) without disturbing display color calibration settings for normal display.

The look up table for display gamma correction is normally used to compensate for specific hardware characteristics of monitors, so as to present a consistent appearance and color balance for display contents over multiple displays. To calibrate the appearance of the colors displayed on a given display device, a normal gamma look up table which is calibrated for the given display device is loaded into a display controller so that the signals looked up according to the normal gamma look up table is corrected for improved display results. When a new and different display device is connected to the display controller, a corresponding normal gamma look up table that is calibrated for the new display device can be loaded into the display controller to perform the correction in real time. The new gamma look up table is used to maintain consistent color reproduction across different display devices. Note that the gamma look up table may also be calibrated according to user preferences. ColorSync from Apple Computer, Inc. is one of such technologies to maintain consistent color reproduction on different display devices. When a change in display device is detected, ColorSync loads the corresponding normal gamma look up table for the current display device into the display controller for calibrated display results.

One embodiment of the present invention provides for time-based blending between the display contents (e.g., as specified in a frame buffer under control of a display controller) and a solid color in real time (e.g., through periodically loading into the display controller a special gamma look up table, determined according to the elapsed time). For example, a time-based blending factor is computed using a sine function according to the elapsed time since the beginning of the fade effect, such that the fade transition according to the blending factor proceeds in small steps at the beginning and end of the transition and larger steps in mid-transition, resulting in a perceptually smoother transition effect. The blending factor is used to blend color components of a solid color (e.g., the background color selected for a fade) with the corresponding entries of a normal gamma look up table to generate a special gamma look up table, where the normal gamma look up table is calibrated for the current display device and the special gamma look up table is loaded temporarily into the display controller for gamma correction. The use of the series of special tables for gamma correction results in the fade effects according to the time-based blending factor. The special gamma look up table for the fade effects is generated from blending the solid color with the normal gamma look up table, which contains the display calibration data. The normal gamma look up table is preserved for returning to the normal operation. The normal gamma look up table can be loaded back into the display controller, if a special gamma look up table is still in the display controller at the end of the visual effect. When a fade in operation is performed, the normal gamma look up table is naturally loaded back into the display controller at the end of the fade in from a solid color. Programs that request or set the display calibration data are not affected by the display fade state.

According to one embodiment of the present invention, it is desirable to prevent application programs from manipulating the gamma correction tables directly to produce the transition effect. If an application writes its own values into the gamma correction table to generate fade effects, the display calibration represented by the normal values of the gamma correction look up table (e.g., calibrated to have consistent color reproduction by ColorSync, or calibrated according to user preferences) may be destroyed, causing visual artifacts in color and contrast.

One embodiment of the present invention provides an effect manager to service the application programs in generating visual effects on behalf of the application programs. The effect manager ensures that the color calibration is maintained while manipulating the color correction parameters (e.g., the contents of the gamma correction table in a display controller) to produce visual effects.

In one embodiment of the present invention, the effect manager is a part of the operating system of the data processing system (e.g., a part of the operating system resource or window server of a computer). The effect manager manipulates the gamma look up table to produce fade effects in real time for the current display contents (e.g., the content as specified by the data in the frame buffer of the system), without regard to what those contents are. One or more applications may present any desired content without having to track the display fade state. Thus, effect manager performs the task of producing the visual effect through manipulating the gamma look up table, while the application programs perform the task of producing the content for display. The display controller combines the gamma look up table and the content in the frame buffer to drive the display device. The task of producing the visual effect and the task of producing the content for display are separated from each other, performed by different programs.

In one embodiment of the present invention, the automated fade effect proceeds without intervention from the requesting application, insulating the application from the details of hardware management, and providing a more consistent user experience across applications using the mechanism. In one embodiment, should an application fail to remove the fade effect and restore the display to the normal operation on its own, on expiration of a reservation time set by the application, the mechanism automatically removes the fade effect and restores the calibrated gamma look up table in the display controller.

In one embodiment of the present invention, an effect manager controls the operation of the transition effects such that the generation of the visual effect may be run synchronously or asynchronously with respect to the application which requesting for the effects. This mechanism greatly simplifies the coding of the application and permits the application to easily update it is user interface while a transition is in progress. For example, an application can request the effect manager to start a fade-in operation asynchronously and then proceed with drawing game play (or movie playback) while the display fade-in is running under control of the effect manager.

Many of the methods of the present invention may be performed with a digital processing system, such as a conventional, general-purpose computer system. Special purpose computers, which are designed or programmed to perform only one function, may also be used.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be a Macintosh computer from Apple Computer, Inc.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The display controller and display device 108 typically includes at least one gamma correction look up table which stores values that may be modified by the microprocessor 103 (e.g., pursuant to ColorSync instructions to modify the contents of the gamma correction look up table(s)). The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

In one embodiment of the present invention, the fade effect is generated from the computer display calibration data, rather than replacing (and losing) the calibration data. For example, the special gamma look up table used temporarily in the display controller for the fade effect is generated from blending the target color and the gamma look up table calibrated for the current display device. Thus, operations of the programs that request or set the display calibration data are not affected by the display fade state.

Figure 2:
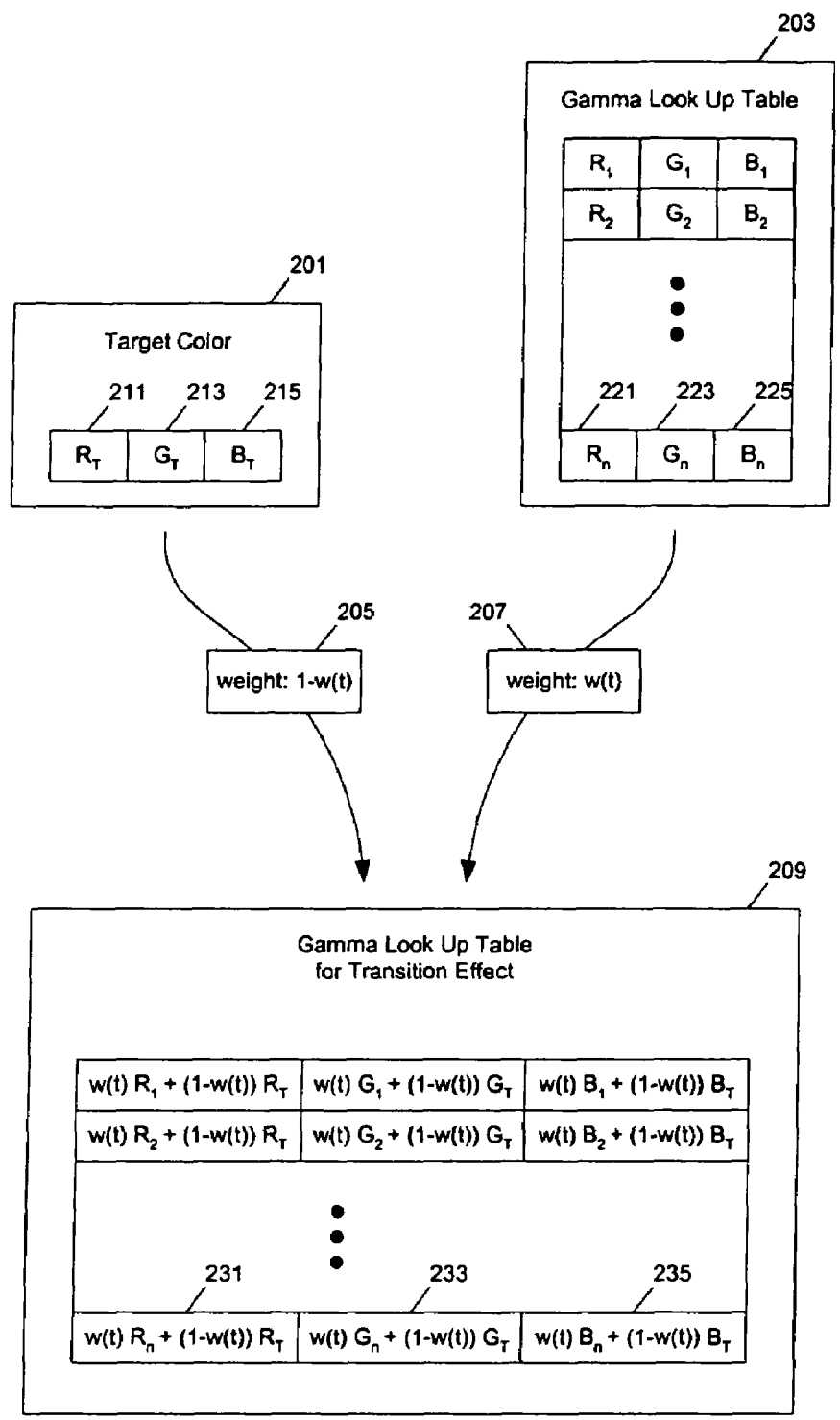
FIG. 2 illustrates a method to adjust a gamma look up table to generate transition effects according to one embodiment of the present invention.

FIG. 2 illustrates a method to adjust a gamma look up table to generate transition effects according to one embodiment of the present invention. In one embodiment, the gamma look up table used by the display controller is updated according to a blending factor that is a function of the elapsed time from the beginning of the transition effect. For example, gamma look up table 203 represents the normal gamma look up table calibrated for normal display operations (e.g., maintained by ColorSync). Thus, when no transition effect is displayed, gamma look up table 203 is loaded into the display controller for gamma correction. To generate a visual effect of fading to (or from) target color 201, a special gamma look up table (209) is generated from blending the target color (201) and the normal gamma look up table (203) according to elapsed time t. For example, at time t, the weight for the normal gamma look up table (203) and the weight for the target color (201) are w(t) and 1−w(t) respectively (207 and 205). Each value of special gamma look up table 209 is a weighted average of the corresponding value in normal gamma look up table 203 and the corresponding value of target color 201, weighted according to factors 207 and 205 according to a function of time t.

For example, if the normal gamma look table is denoted as $\{R(r), G(g), B(b)\}$ and the target color is $\{R_T, G_t, B_t\}$, where r, g, b are the red, green and blue components of an input color, the special gamma look up table $\{R'(r), G'(g), B'(b)\}$ can be computed according to:

$$R'(r)=w(t) \times R(r)+(1-w(t)) \times R_t$$

$$G'(r)=w(t) \times G(r)+(1-w(t)) \times G_t$$

$$B'(r)=w(t) \times B(r)+(1-w(t)) \times B_t$$

Thus, it is seen that the color looked up from the special gamma look up table $\{R'(r), G'(g), B'(b)\}$ is the result of blending the color looked up from the normal gamma look up table $\{R(r), G(g), B(b)\}$ and the target color, according to the blending factor w(t). Note that the target color can be specified as the color components $\{r_T, g_T, b_T\}$ before the gamma correction; and, $\{R_T, G_t, B_t\}$ can be obtained from the normal gamma look up table (e.g., $R_T=R(r_T)$, $G_T=G(g_T)$, $B_T=B(b_T)$).

In one embodiment of the present invention, the automated fade effect results from the time-based blending between display contents and a specified solid color value using a sine function of time, such that the fade transition proceeds in small steps at the beginning and end of the transition and larger steps in mid-transition, which provides a perceptually smooth transition effect.

Figure 3:
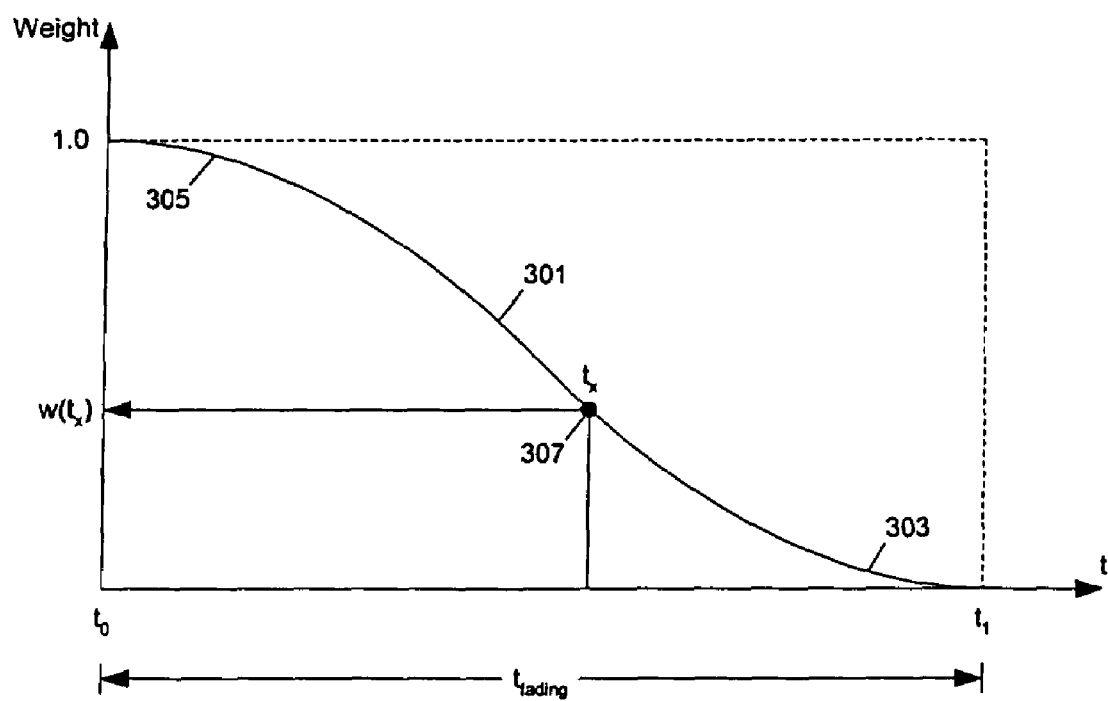
FIG. 3 shows a time-based blending function for displaying a fade-in transition effect according to one embodiment of the present invention.

FIG. 3 shows a time-based blending function for displaying a fade-in transition effect according to one embodiment of the present invention. In one embodiment of the present invention, the blending factor (e.g., weight w(t) for the normal gamma look up table) is a function of the elapsed time t measured from the beginning of the transition. For example, when the special gamma table is to be computed, the elapsed time $t_x$ is determined (e.g., from a real time clock of a data processing system); and then, weight $w(t_x)$ is computed as a smooth function of the elapsed time. In one embodiment, the weight as a function of elapsed time changes slowly at the beginning (e.g., 305 near $t_0$) and the end (e.g., 303 near $t_1$) of the transition period $t_{fading}$; and, the weight changes fast in the middle of the transition period (e.g., 301). For example, the weight for a fade out effect can be computed from:

$$w(t)=\sin \left[(\pi/2) \times (1+t/t_{fading})\right]$$

Determining the weight according to the elapsed time ensures that blending for the transition effect is a smooth function of time. Thus, even if the computations of the special gamma look up table occur at irregular time intervals, the variation of the weight as a function of time is still smooth, resulting a perceptually smooth transition effect.

In one embodiment of the present invention, the computation resource for computing the special gamma look up table is shared in time for multiple tasks. For example, an operating system may schedule a CPU to perform the computation for a short period at a time for each of several tasks so that it appears that the CPU is performing the several tasks at the same time. On a multi-tasking data processing system, the computation of the special gamma look up table may not be at a precise regular time interval. Thus, in such an embodiment, it is preferred to determine the blending factor w(t) according to a determined elapse time to have a good quality of fading effects.

Alternatively, the weight may be determined for each step of transition. For example, the set of weight factors may be determined from $w(i)=\sin \pi/2 \ (i/n+1)$, where n is the total number of transition steps; and, w(i) is the weight factor for the i'th step. Although the weight factors appear to be a smooth function of the step index, they may not be a smooth function of time, since the computations of the special gamma look up table may occur at irregular time intervals, resulting perceptually artifacts in the transition effect. However, without compromising the quality of the visual effect, such an approach can be used on a system where the computation of the special gamma look up table can be scheduled at a regular time interval. When the time interval is regular and known, the step index is essentially a measure of the elapsed time. For example, in one embodiment of the present invention, the computation of the special gamma look up table is performed at a regular time interval using a dedicated hardware on a display controller, when such hardware is available. When a time period for a transition effect is specified, the total number of steps can be determined from the desirable time interval for updating the special gamma table (e.g., determined according to the display refreshing frequency) and the time period. Alternatively, a fixed set of weight factors may be determined for a predetermined number of total steps; and, the time interval is adjusted according to the total number of steps and the specified time period for the effect. However, such an approach may update the special gamma table at an unnecessarily high frequency when the specified time period is short and at too low a frequency when the specified time period is long, resulting in waste in computation resources and visual artifacts respectively.

Figure 4:
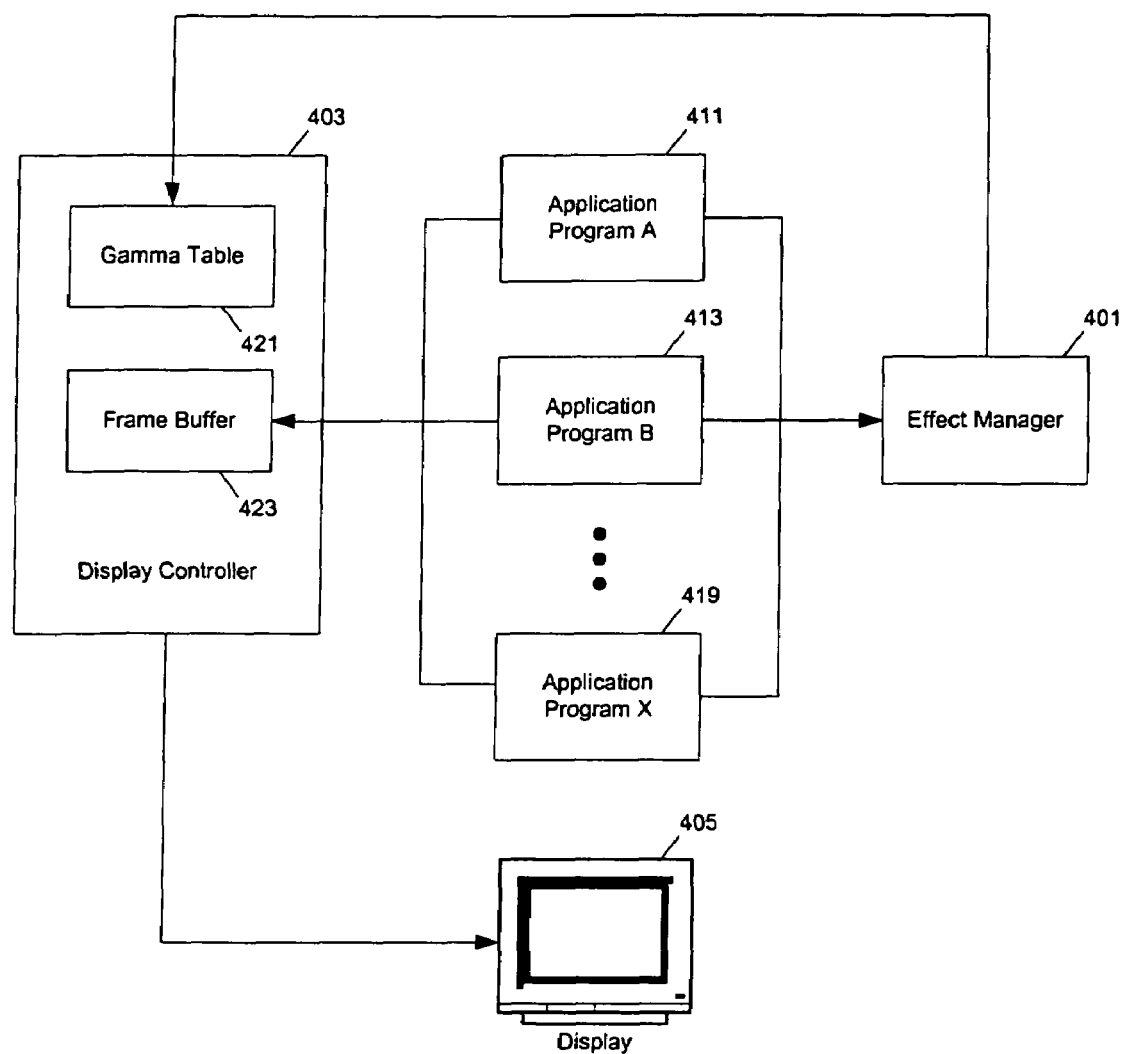
FIG. 4 illustrates a method to display transition effects for multiple application programs according to one embodiment of the present invention.

FIG. 4 illustrates a method to display transition effects for multiple application programs according to one embodiment of the present invention. In one embodiment of the present invention, application programs (e.g., 411, 413, 419) start visual effects by submitting requests to effect manager 401. Effect manager manipulates gamma look up table 421 to generate the visual effects (e.g., fade in, or, fade out, blinking, and others). Applications (e.g., 411, 413, 419) draw the contents onto frame buffer 423 by generating and updating the color data for various pixels and storing them in the corresponding locations in the frame buffer for the pixels. Typically, a frame buffer is a memory on display controller 403 that generates the signals to drive display device 405 periodically at a display refreshing frequency. However, the frame buffer may also be located at a different location on a data processing system, such as in a RAM (e.g., 105 in FIG. 1) of the data processing system. Typically, display controller 403 generates the signals to drive the display device without using the processing power of the CPU (central processing unit) of the data processing system. However, on some systems, a CPU may be at least partially relied upon for the generation of the signals to drive the display devices.

In one embodiment of the present invention, display controller 403 has a graphics processing unit (GPU) (not shown in FIG. 4) for combining the data in frame buffer 423 and gamma look up table 421 to drive display device 405. The GPU is a processor different and separate from the CPU. In one embodiment of the present invention, effect manager 401 includes a portion of program instructions for the GPU to manipulate the gamma look up table (e.g., blending the normal gamma look up table with a target color according to a specified blending factor or function). In one embodiment, the portion of the program instructions is loaded on the display controller so that the display controller automatically performs the visual effects through executing the instructions on the GPU, upon receiving a request. In one embodiment, the GPU performs the blending in real time after the gamma correction using the normal gamma look up table without generating the special gamma look up table. Where the GPU can perform the blending in real time, the GPU may also receive parameters that specify a portion of the display area (e.g., a window for a request application) such that the GPU blends the target color with the values looked up from the gamma correction table to show the transition effect only for the specified portion (e.g., using one blending factor for the specified portion of the display area for blending with the target color and another factor for the rest of the display area so that the rest of the display area is not affect by the target color). Further, the GPU may perform the blending according to a frame of blending factors for all the pixels and a frame of target colors for all the pixels, where values for the frame of blending factors and the frame of target colors can be set for different regions so that different applications may perform different visual effects in different regions at the same time. In one embodiment, the GPU generates the special gamma look up table for gamma correction while maintaining a copy of the normal gamma look up table. Where both a special gamma look up table and a normal gamma look up table are separately maintained, it is possible to switch in real time between the two tables so that one table (e.g., the special gamma look up table) can be used for a portion of the display (e.g., the portion containing one or more windows which are displaying the fade transition) and the other table (e.g., the normal gamma look up table) can be used for the other portion of the display (e.g., the desktop user interface) where a fade transition is not displayed. The GPU can selectively use one or the other LUT depending on the current pixel position which is being driven to the display device during a refresh cycle, and in this manner only a portion of the display (e.g., a single window which does not occupy the entire displayable area of the display device) can show the transition effect while the rest of the display (e.g., other windows of a "desktop") do not show the transition effect.

In one embodiment of the present invention, the effect manager uses the CPU (e.g., microprocessor 103 in FIG. 1) to compute the special gamma look up table and loads the special gamma look up table into the display controller. In such an embodiment, there is no special requirement on the display controller to support the generation of the visual effect. This implementation may be advantageously used where the entire display is showing the transition effect (rather than just one or more portions of the display). If it is desired to show the transition effect in only a portion of the entire display (e.g., in only one or more windows but not the entire display), then the CPU may cause the display controller to use two separate look up tables for the different portions as discussed above.

In FIG. 4, effect manager 401 insulates the implementation details of the visual effect from application programs (e.g., 411, 413, 419). When a display controller is detected, effect manager 401 can determine the desirable implementation for the visual effects (e.g., using the dedicated hardware, loading the program instructions into the display controller for the GPU, or using the CPU to compute the special gamma look up tables). Thus, application programs can be used with different hardware platforms without modification. This greatly simplifies the coding for the application programs.

Figure 5:
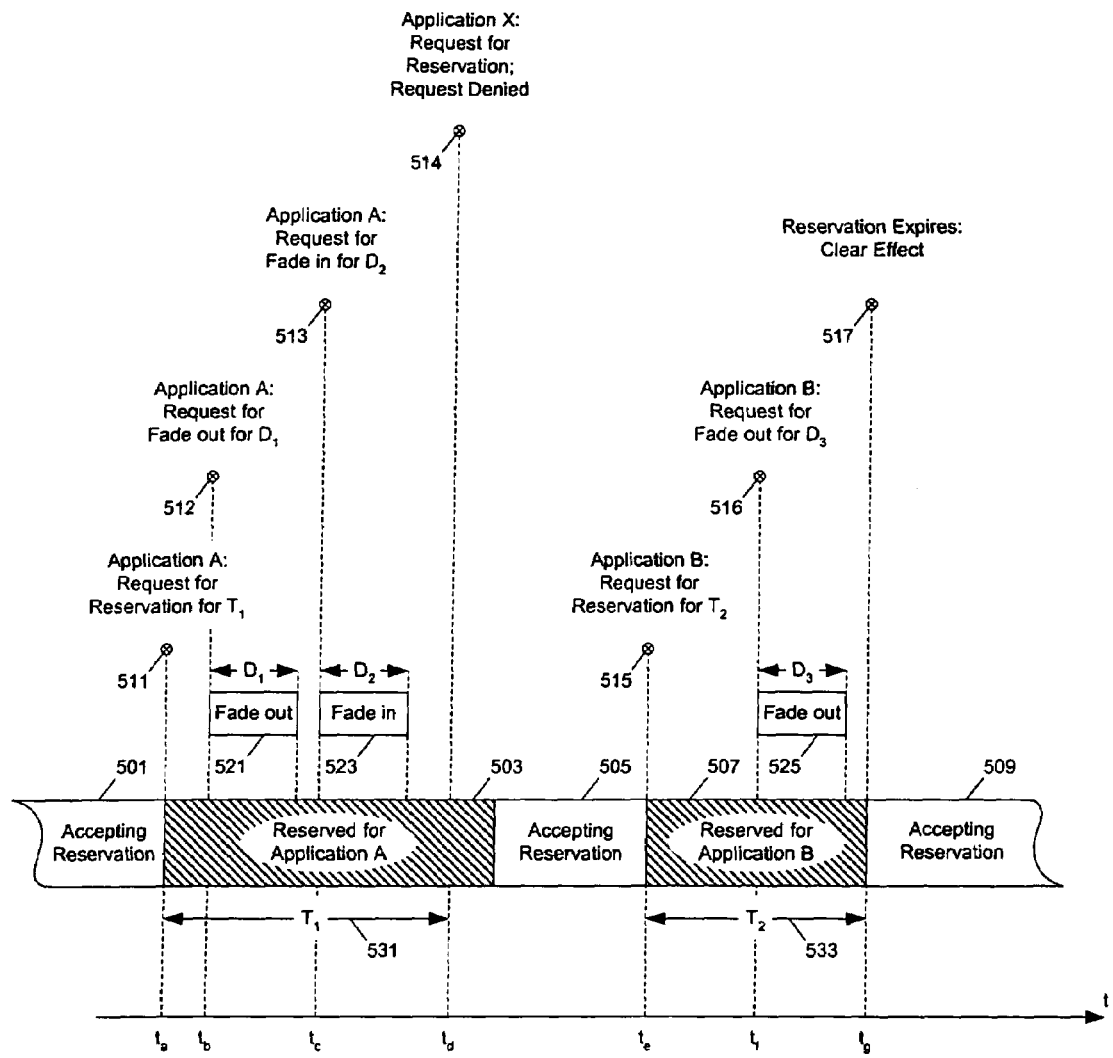
FIG. 5 shows an example scenario of displaying transition effects according to one embodiment of the present invention.

FIG. 5 shows an example scenario of displaying transition effects according to one embodiment of the present invention. In one embodiment of the present invention, the effect manager serves the requests for performing visual effects from multiple application programs. To avoid conflicting operations, a reservation system is provided so that the fading operations of one program will not interfere with the operations of other programs.

In FIG. 5, there is no active reservation during time period 501; and, the effect manager accepts the requests for reservation. At time $t_a$ (511), application A requests for a reservation for duration $T_1$. Since there is no conflicting reservation, the request from application A is accepted; and, time period $T_1$ (531) is then reserved for application A, during which the effect manager performs visual effects only in response to request from application A. During the time period $T_1$ (531), the effect manager denies any requests from applications other than application A. In one implementation of the present invention, a token is given to application A such that application A can request for a fade operation using the token. In one embodiment of the present invention, application A may be one of a suite of applications; and, application A may pass the token to another one of the suite of applications to allow that application to request a visual effect during the time period reserved by the token.

At time $t_b$ (512), application A requests for a fade out effect for a duration of $D_1$. Thus, the effect manager causes the periodic adjustments of the color correction parameters (e.g., gamma look up table) for the display of the fade out effect. For example, during period $D_1$ (521), a special gamma look up table is generated and updated a number of times, according to the elapsed time, to the show the fade effect. After the fade out, the display device shows a solid color on the screen, hiding the details of the information to be displayed on the frame buffer, since the special gamma look up table used for driving the display device maps any input colors to the same solid color. Program A may request for a synchronous fade out so that the program A is blocked for performing further operations until the end of the fade out period (521). Alternatively, program A may request for an asynchronous fade out so that program A can start further operations immediately after the submission of the request, without having to wait until the fade out is complete. Application A and other application programs may draw contents on the frame buffer during and after fade out period 521.

At time $t_c$ (513), application A requests for fade in for duration $D_2$. After duration $D_2$ (523), the weight for the solid color becomes zero; and, the gamma look up table in the display controller returns naturally to the normal values, which is calibrated for the current display device.

During the time period $T_1$ (531), application X may request for a reservation for visual effects (e.g., at time $t_d$ 514). Since such a request has a conflict with the reservation of application A, the request is denied. At the end of the time period $T_1$ (531), the reservation of application A expires; and, the effect manager is in a position to accept reservation requests again.

If the gamma look up table in the display controller is not already returned to the normal values at the end of the reservation period, the effect manager clears the effect by restoring the normal gamma look up table calibrated for the current display device. For example, after application B reserves for a time period $T_2$ (e.g., at time $t_e$) and requests for a fade out effect (e.g., at time $t_f$), no fade in effect is requested by application B during the reserved period $T_2$ (533). Thus, when the reservation of application B expires at time $t_g$, the effect manager automatically clears the effect (e.g., by automatically performing a fade in, or simply restoring the gamma look up table to its normal value).

Figure 6:
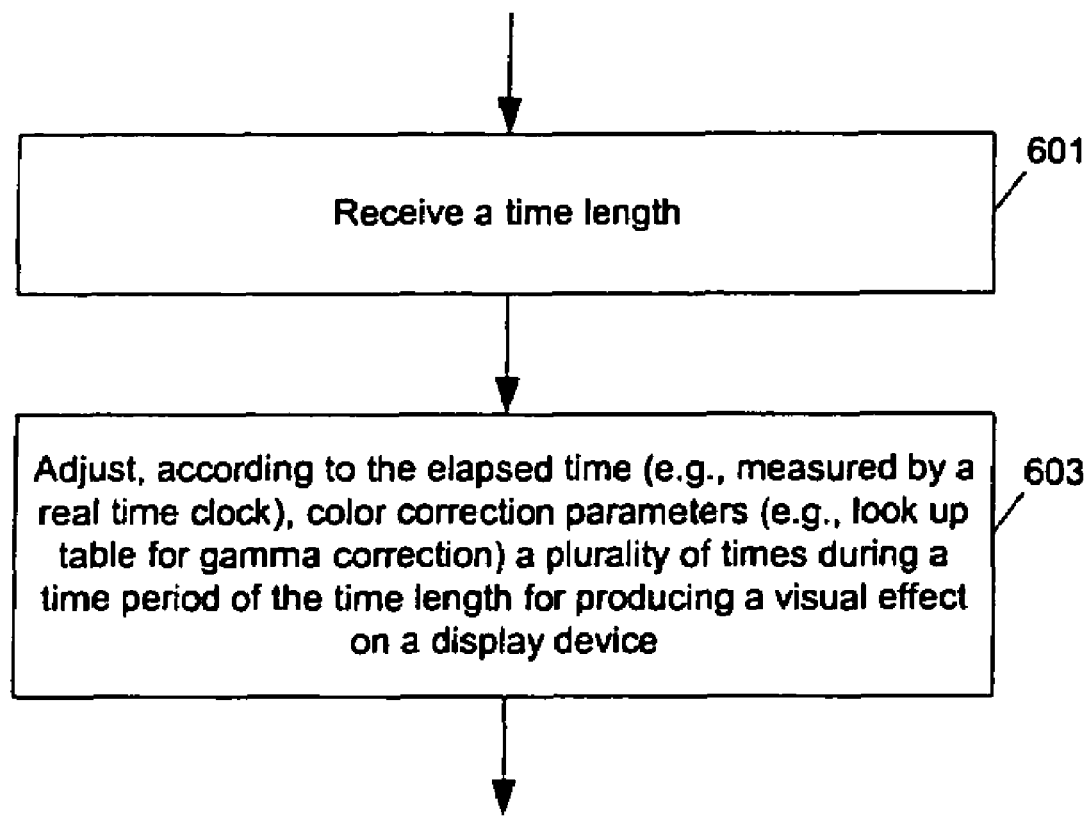
FIG. 6 shows a method to display transition effects according to one embodiment of the present invention.

FIG. 6 shows a method to display transition effects according to one embodiment of the present invention. After operation 601 receives a time length, operation 603 adjusts, according to the elapsed time (e.g., measured by a real time clock), color correction parameters (e.g., look up table for gamma correction) a plurality of times during a time period of the time length for producing a visual effect on a display device. In one embodiment, an effect manager receives the time length from an application program and performs the adjustment (or causes the adjustment to be performed) on behalf of the requesting application program; and, the effect manager is a process separate and different from the requesting application program. In one embodiment, the effect manager is capable of receiving requests for visual effects from different application programs.

Figure 7:
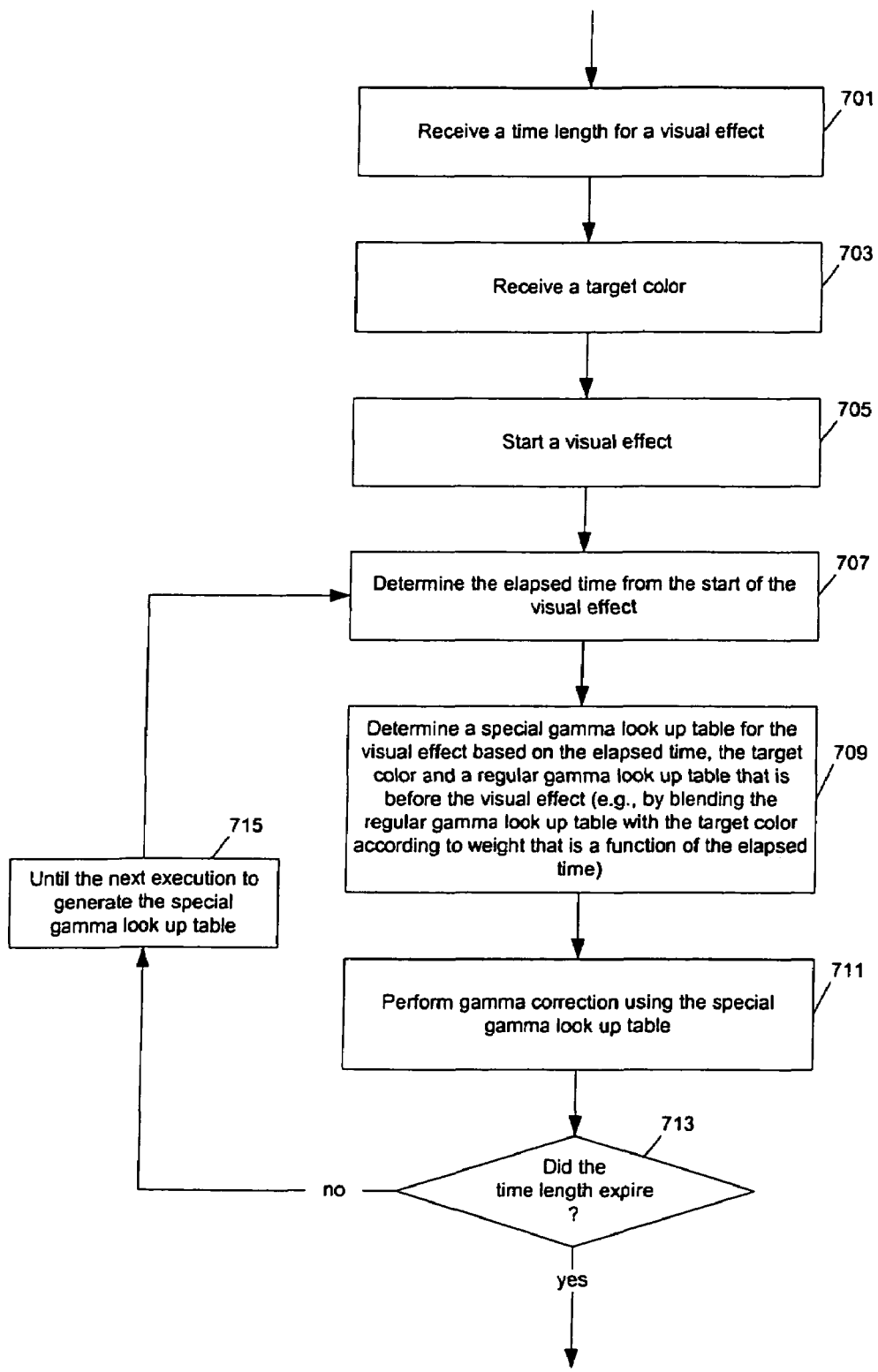
FIG. 7 shows a detailed method to display transition effects according to one embodiment of the present invention.

FIG. 7 shows a detailed method to display transition effects according to one embodiment of the present invention. After operation 701 receives a time length for a visual effect and operation 703 receives a target color, operation 705 starts a visual effect. Operation 707 determines the elapsed time from the start of the visual effect. Operation 709 determines a special gamma look up table for the visual effect based on the elapsed time, the target color and a normal gamma look up table that is before the visual effect (e.g., by blending the normal gamma look up table with the target color according to weight that is a function of the elapsed time). Operation 711 performs gamma correction using the special gamma look up table. If operation 713 determines the time length has not expired, other operations may be performed until the next execution to generate the special gamma look up table (715). In one embodiment of the present invention, a timer is activated to schedule the next execution to generate the special gamma look up table. In one embodiment of the present invention, the time interval used for scheduling the next execution is determined based on the display refreshing frequency (e.g., using a time interval so that the special gamma look up table is generated in a frequency substantially the same as the display refreshing frequency). Thus, special gamma look up tables are generated according to the elapsed time for a number of times during the time period of the received time length.

In one embodiment of the present invention, a resource reservation mechanism allows an application or a suite of applications to reserve the fade mechanism system-wide, so that other applications do not interfere with the desired transition effect.

Figure 8:
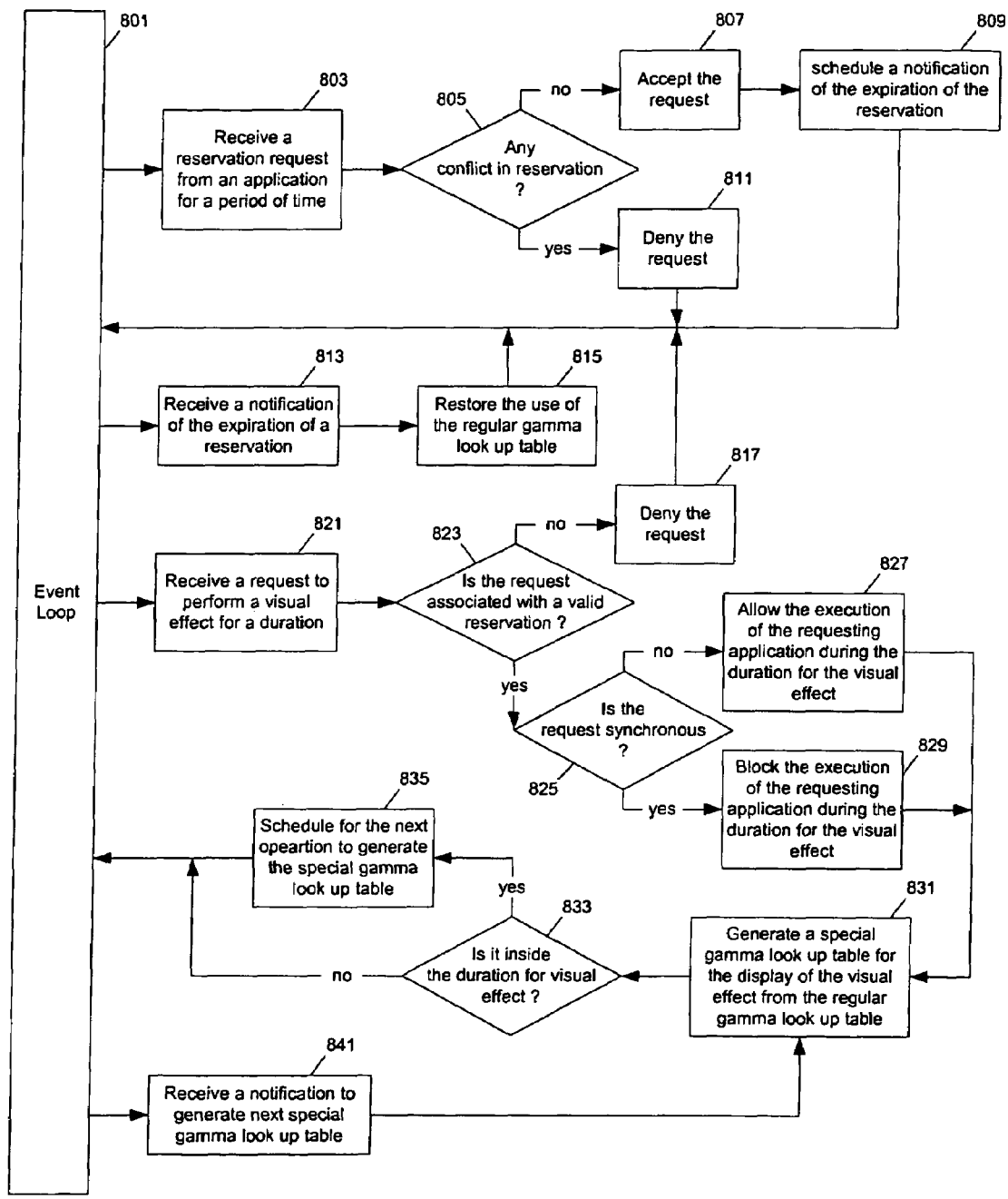
FIG. 8 shows a method to manage the displaying of transition effects for multiple applications according to one embodiment of the present invention.

FIG. 8 shows a method to manage the displaying of transition effects for multiple applications according to one embodiment of the present invention. In one embodiment of the present invention, the effect manager is event driven. Operation 801 maintains an event loop, in which events are queued for processing one after another. After receiving (803) a reservation request from an application for a period of time, operation 805 determines whether there is any conflict in reservation. If there is no conflict in reservation, operation 807 accepts the request; and, operation 809 schedules a notification of the expiration of the reservation according to the time period associated with the reservation. If there is a conflict in reservation, operation 811 denies the request.

After receiving (813) a notification of the expiration of a reservation, operation 815 restores the use of the normal gamma look up table. For example, a fade in operation may be performed automatically to bring the gamma look up table in the display controller to its normal values; alternatively, the effect manager may cause a blink (or other preferred effect according to a user) and restore the gamma look up table to the normal values; or, the effect manager may restore the normal gamma look up table calibrated for the current display device abruptly without any visual effect. Thus, the automated mechanism generates visual effects through manipulating the color correction parameters (e.g., gamma look up table) while preserving the color calibration data (e.g., maintained by ColorSync), so that on the completion of a visual effect (e.g., a transition, such as fade in or fade out) display calibration is preserved and can be automatically restored.

After receiving (821) a request to perform a visual effect for a duration, operation 823 determines whether the request is associated with a valid reservation. If the request is not associated with a valid reservation, operation 817 denies the request; otherwise, operation 825 determines if the request is synchronous. If the request is synchronous, operation 829 blocks the execution of the requesting application during the duration for the visual effect; however, if the request is asynchronous, operation 827 allows the execution of the requesting application during the duration for the visual effect. After operation 831 generates a special gamma look up table for the display of the visual effect from the normal gamma look up table, operation 833 determines whether it is still inside the duration for visual effect. Using the special gamma look up table in gamma correction displays the visual effect. If it is still inside the duration for visual effect, operation 835 schedules for the next operation to generate the special gamma look up table; otherwise, the visual effect is complete. In one embodiment of the present invention, a timer is set to schedule the next operation to generate (or update) the special gamma look up table at a time interval determined according to the display refreshing frequency.

After receiving (841) a notification to generate next special gamma look up table, operation 831 is performed to generate a special gamma look up table for the display of the visual effect from the normal gamma look up table. Generating (updating) special gamma look up tables for gamma correction within the duration of the visual effect (through operations 831, 833, 835 and 841) causes the contents in the frame buffer being displayed with the desired visual effect.

In one embodiment of the present invention, the transition effects are managed outside of the calling program. In one implementation, they are managed within the window server process. For example, a timer driven operation within the server makes the periodic adjustments to the hardware gamma table needed to perform the fade effect, blending the application specified solid color with the display calibration data to achieve the desired effect.

Embodiments of the present invention further provide additional features to ease the burden on application developers. One embodiment of the present invention abstracts all these management details and hides them within the window server process, so that all a developer needs to do is asking for a fade to (or from) color, specifying a starting and ending saturation and a time period the fade transition should take. One embodiment of the present invention integrates the fade effect with the internal gamma table management so that a developer need not be concerned with restoring the gamma table with ColorSync data when done.

In one embodiment, the window server process itself contains the original calibration data for the display, as well as the timing information and the fade color value, so that the window server process can manage all the fade effects without intervention from the calling application. Options are provided to allow the calling application to wait for the fade operation to complete, or to continue with its own operations while the window server manages the fade transition.

For example, in one embodiment, transition effects may be run synchronously or asynchronously with respect to the calling application, simplifying the application code and permitting the application to easily update its user interface while a transition is in progress. For example, a movie player may call the effect manager to perform fade in asynchronously. While the effect manager adjusting the gamma look up table periodically to generate the fade in effect, the movie player can play a movie (e.g., a QuickTime movie) such that a number of frames of different contents can be displayed during the period of fade in. Further, since the details of the transition effect are managed automatically without application intervention, the transition effects are consistent across applications, reducing application-specific problems. Further, the mechanism insulates the application from hardware specific details. The mechanism can take specific details of the underlying system into consideration to produce a consistent effect while minimizing impact on system resources such as available hardware, processor and bus bandwidth.

Error recovery built into the system according to at least one embodiment of the present invention ensures that application programs will not lose the use of the calibrated display in the event of an error of one application program. For example, the ColorSync color calibration data is preserved and used as the basis for the display fade effect and for properly restoring the display gamma correction table with the ColorSync data on completion of fade effects.

The foregoing description of the methods in FIGS. 7 and 8 assumes a particular process flow in which certain operations or actions follow other operations or actions. It will be appreciated that alternative flows may also be practiced with the present invention. Other alternative sequences of operations may be envisioned by those skilled in the art.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to produce visual effect on a display, the method comprising:
   receiving a first time length; and
   adjusting, according to an elapsed time during the first time length, color correction parameters a plurality of times during a time period of the first time length wherein time-based adjustments are made in small steps in the beginning and end and large steps in the middle of the adjustment transition to provide a perceptually smooth transition effect.

2. A method as in claim 1, wherein the color correction parameters comprise at least one look up table for gamma correction; and wherein said elapsed time is measured by a real time clock which measures time during production of the visual effect.

3. A method as in claim 2, wherein the at least one look up table is adjusted to blend input color signals with a color; and wherein the input color signals is blended with the color according to the elapsed time.

4. A method to produce visual effect on a display, the method comprising:
   receiving a first time length; and
   adjusting, according to an elapsed time during the first time length, color correction parameters a plurality of times during a time period of the first time length;
   wherein the color correction parameters comprise at least one look up table for gamma correction, and wherein said elapsed time is measured by a real time clock which measures time during production of the visual effect; and
   wherein the at least one look up table is adjusted to blend input color signals with a color; and wherein the input color signals is blended with the color according to the elapsed time, and wherein a weight on the color to blend the input color signals with the color changes faster near a middle of the time period than at one of:
   a) a beginning of the time period; and
   b) an end of the time period.

5. A method as in claim 4, wherein the weight is determined from a function of the elapsed time.

6. A method as in claim 1, further comprising:
   performing color correction according to the color correction parameters.

7. A method as in claim 1, wherein said adjusting the color correction parameters comprises:
   instructing a graphics processing unit (GPU) to adjust the color correction parameters according to the elapsed time.

8. A method as in claim 1, wherein a frequency for said adjusting the color correction parameters is determined according to a refreshing frequency for displaying, on the display, input color signals corrected by the color correction parameters.

9. A method to produce visual effect on a display, the method comprising:
receiving a first time length; and
adjusting, according to an elapsed time during the first time length, color correction parameters a plurality of times during a time period of the first time length;
wherein a frequency for said adjusting the color correction parameters is determined according to a refreshing frequency for displaying, on the display, input color signals corrected by the color correction parameters; and
wherein the frequency for said adjusting the color correction parameters is substantially equal to the refreshing frequency.

10. A method to produce visual effect on a display, the method comprising:
receiving a first time length; and
adjusting, according to an elapsed time during the first time length, color correction parameters a plurality of times during a time period of the first time length, and wherein said adjusting the color correction parameters comprises:
determining a first value of the elapsed time;
determining first values of the color correction parameters according to the first value of the elapsed time;
determining a second value of the elapsed time; and
determining second values of the color correction parameters according to the second value of the elapsed time.

11. A method as in claim 10, wherein said adjusting the color correction parameters is performed by an operating system of a data processing system according to a task scheduler in response to a request from an application program running on the data processing system.

12. A method as in claim 11, wherein the application program is allowed to execute operations during the time period.

13. A method as in claim 11, wherein the application program is not allowed to execute operations until the request is fulfilled.

14. A method as in claim 1, further comprising:
restoring, after the time period, the color correction parameters to values that the color correction parameters have before the time period.

15. A method as in claim 14, wherein said restoring is performed on expiration of a reservation time period, within which said adjusting the color correction parameters is performed.

16. A method to produce visual effect on a display, the method comprising:
receiving a first time length;
adjusting, according to an elapsed time during the first time length, color correction parameters a plurality of times during a time period of the first time length;
receiving a second time length from a second application program; and
adjusting, according to a second elapsed time, the color correction parameters a plurality of times during a time period of the second length in response to a request from the second application program;
wherein the first time length is received from a first application program; and
wherein said adjusting the color correction parameters during the time period of the first length is in response to a request from the first application program.

17. A method to produce visual effect on a display, the method comprising:
receiving a first time length;
adjusting, according to an elapsed time during the first time length, color correction parameters a plurality of times during a time period of the first time length;
receiving a request for a reservation from a first application program; and
granting a first reservation to the first application program in response to a determination that there is no pending reservation;
wherein the first time length is received from the first application program; and
wherein said adjusting the color correction parameters is in response to a request from the first application program that is in possess of the first reservation.

18. A method as in claim 17, wherein said adjusting the color correction parameters is performed after a determination that the request from the first application program is received within a reservation time period for the first reservation.

19. A method as in claim 18, further comprising:
restoring, upon expiration of the reservation, the color correction parameters to values that the color correction parameters have before the reservation.

20. A machine readable medium containing executable computer program instructions which when executed by a data processing system cause said system to perform a method to produce visual effect on a display of the data processing system, the method comprising:
receiving a first time length; and
adjusting, according to an elapsed time during the first time length, color correction parameters a plurality of times during a time period of the first time length.

21. A medium as in claim 20, wherein the color correction parameters comprise at least one look up table for gamma correction; and wherein said elapsed time is measured by a real time clock which measures time during production of the visual effect.

22. A medium as in claim 21, wherein the at least one look up table is adjusted to blend input color signals with a color; and wherein the input color signals is blended with the color according to the elapsed time.

23. A machine readable medium containing executable computer program instructions which when executed by a data processing system cause said system to perform a method to produce visual effect on a display of the data processing system, the method comprising:
receiving a first time length; and
adjusting, according to an elapsed time during the first time length, color correction parameters a plurality of times during a time period of the first time length;
wherein the at least one look up table is adjusted to blend input color signals with a color; and wherein the input color signals is blended with the color according to the elapsed time; and
wherein a weight on the color to blend the input color signals with the color changes faster near a middle of the time period than at one of:
a) a beginning of the time period; and
b) an end of the time period.

24. A medium as in claim 23, wherein the weight is determined from a function of the elapsed time.

25. A medium as in claim 20, wherein the method further comprises:
  performing color correction according to the color correction parameters.

26. A medium as in claim 20, wherein said adjusting the color correction parameters comprises:
  instructing a graphics processing unit (GPU) to adjust the color correction parameters according to the elapsed time.

27. A medium as in claim 20, wherein a frequency for said adjusting the color correction parameters is determined according to a refreshing frequency for displaying, on the display, input color signals corrected by the color correction parameters.

28. A machine readable medium containing executable computer program instructions which when executed by a data processing system cause said system to perform a method to produce visual effect on a display of the data processing system, the method comprising:
  receiving a first time length; and
  adjusting, according to an elapsed time during the first time length, color correction parameters a plurality of times during a time period of the first time length;
  wherein a frequency for said adjusting the color correction parameters is determined according to a refreshing frequency for displaying, on the display, input color signals corrected by the color correction parameters; and
  wherein the frequency for said adjusting the color correction parameters is substantially equal to the refreshing frequency.

29. A machine readable medium containing executable computer program instructions which when executed by a data processing system cause said system to perform a method to produce visual effect on a display of the data processing system, the method comprising:
  receiving a first time length; and
  adjusting, according to an elapsed time during the first time length, color correction parameters a plurality of times during a time period of the first time length;
  wherein said adjusting the color correction parameters comprises:
    determining a first value of the elapsed time;
    determining first values of the color correction parameters according to the first value of the elapsed time;
    determining a second value of the elapsed time; and
    determining second values of the color correction parameters according to the second value of the elapsed time.

30. A machine readable medium containing executable computer program instructions which when executed by a data processing system cause said system to perform a method to produce visual effect on a display of the data processing system, the method comprising:
  receiving a first time length; and
  adjusting, according to an elapsed time during the first time length, color correction parameters a plurality of times during a time period of the first time length;
  wherein said adjusting the color correction parameters is performed by an operating system of a data processing system according to a task scheduler in response to a request from an application program running on the data processing system.

31. A medium as in claim 30, wherein the application program is allowed to execute operations during the time period.

32. A medium as in claim 30, wherein the application program is not allowed to execute operations until the request is fulfilled.

33. A medium as in claim 20, wherein the method further comprises:
  restoring, after the time period, the color correction parameters to values that the color correction parameters have before the time period.

34. A medium as in claim 33, wherein said restoring is performed on expiration of a reservation time period, within which said adjusting the color correction parameters is performed.

35. A machine readable medium containing executable computer program instructions which when executed by a data processing system cause said system to perform a method to produce visual effect on a display of the data processing system, the method comprising:
  receiving a first time length;
  adjusting, according to an elapsed time during the first time length, color correction parameters a plurality of times during a time period of the first time length;
  receiving a second time length from a second application program; and
  adjusting, according to an elapsed time, the color correction parameters a plurality of times during a time period of the second length in response to a request from the second application program;
  wherein the first time length is received from a first application program; and
  wherein said adjusting the color correction parameters during the time period of the first length is in response to a request from the first application program.

36. A machine readable medium containing executable computer program instructions which when executed by a data processing system cause said system to perform a method to produce visual effect on a display of the data processing system, the method comprising:
  receiving a first time length;
  adjusting, according to an elapsed time during the first time length, color correction parameters a plurality of times during a time period of the first time length;
  receiving a request for a reservation from a first application program; and
  granting a first reservation to the first application program in response to a determination that there is no pending reservation;
  wherein the first time length is received from the first application program; and
  wherein said adjusting the color correction parameters is in response to a request from the first application program that is in possess of the first reservation.

37. A medium as in claim 36, wherein said adjusting the color correction parameters is performed after a determination that the request from the first application program is received within a reservation time period for the first reservation.

38. A medium as in claim 37, wherein the method further comprises:
  restoring, upon expiration of the reservation, the color correction parameters to values that the color correction parameters have before the reservation.

39. A data processing system to produce visual effect on a display device, the data processing system comprising:
  means for receiving a first time length; and means for adjusting, according to an elapsed time during the first time length, color correction parameters a plurality of times during a time period of the first time length.

40. A data processing system as in claim 39, wherein the color correction parameters comprise at least one look up table for gamma correction; and wherein said elapsed time is measured by a real time clock which measures time during production of the visual effect.

41. A data processing system to produce visual effect on a display device, the data processing system comprising:
means for receiving a first time length; and
means for adjusting, according to an elapsed time during the first time length, color correction parameters a plurality of times during a time period of the first time length;
wherein the color correction parameters comprise at least one look up table for gamma correctiom and wherein said elapsed time is measured by a real time clock which measures time during production of the visual effect; and
wherein the at least one look up table is adjusted to blend input color signals with a color; and wherein the input color signals is blended with the color according to the elapsed time.

42. A data processing system as in claim 41, wherein a weight on the color to blend the input color signals with the color changes faster near a middle of the time period than at one of:
a) a beginning of the time period; and
b) an end of the time period.

43. A data processing system as in claim 42, wherein the weight is determined from a function of the elapsed time.

44. A data processing system as in claim 39, further comprising:
means for performing color correction according to the color correction parameters.

45. A data processing system as in claim 39, wherein said means for adjusting the color correction parameters comprises:
means for instructing a graphics processing unit (GPU) to adjust the color correction parameters according to the elapsed time.

46. A data processing system as in claim 39, wherein a frequency for adjusting the color correction parameters is determined according to a refreshing frequency for displaying, on the display device, input color signals corrected by the color correction parameters.

47. A data processing system to produce visual effect on a display device, the data processing system comprising:
means for receiving a first time length; and
means for adjusting, according to an elapsed time during the first time length, color correction parameters a plurality of times during a time period of the first time length;
wherein a frequency for adjusting the color correction parameters is determined according to a refreshing frequency for displaying, on the display device, input color signals corrected by the color correction parameters; and
wherein the frequency for adjusting the color correction parameters is substantially equal to the refreshing frequency.

48. A data processing system to produce visual effect on a display device, the data processing system comprising:
means for receiving a first time length; and
means for adjusting, according to an elapsed time during the first time length, color correction parameters a plurality of times during a time period of the first time length
wherein said means for adjusting the color correction parameters comprises:
means for determining a first value of the elapsed time;
means for determining first values of the color correction parameters according to the first value of the elapsed time;
means for determining a second value of the elapsed time; and
means for determining second values of the color correction
parameters according to the second value of the elapsed time.

49. A data processing system as in claim 48, wherein the color correction parameters are adjusted by an operating system of a data processing system according to a task scheduler in response to a request from an application program running on the data processing system.

50. A data processing system as in claim 49, wherein the application program is allowed to execute operations during the time period.

51. A data processing system as in claim 49, wherein the application program is not allowed to execute operations until the request is fulfilled.

52. A data processing system as in claim 39, further comprising:
means for restoring, after the time period, the color correction parameters to values that the color correction parameters have before the time period.

53. A data processing system as in claim 52, wherein the color correction parameters are restored on expiration of a reservation time period, within which said adjusting the color correction parameters is performed.

54. A data processing system to produce visual effect on a display device, the data processing system comprising:
means for receiving a first time length;
means for adjusting, according to an elapsed time during the first time length, color correction parameters a plurality of times during a time period of the first time length;
means for receiving a second time length from a second application program; and
means for adjusting, according to an elapsed time, the color correction parameters a plurality of times during a time period of the second length in response to a request from the second application program;
wherein the first time length is received from a first application program; and
wherein the color correction parameters are adjusted during the time period of the first length in response to a request from the first application program.

55. A data processing system to produce visual effect on a display device, the data processing system comprising:
means for receiving a first time length;
means for adjusting, according to an elapsed time during the first time length, color correction parameters a plurality of times during a time period of the first time length;
means for receiving a request for a reservation from a first application program; and
means for granting a first reservation to the first application program in response to a determination that there is no pending reservation;
wherein the first time length is received from the first application program; and wherein the color correction parameters are adjusted in response to a request from the first application program that is in possess of the first reservation.

56. A data processing system as in claim 55, wherein the color correction parameters are adjusted after a determination that the request from the first application program is received within a reservation time period for the first reservation.

57. A data processing system as in claim 56, further comprising:
means for restoring, upon expiration of the reservation, the color correction parameters to values that the color correction parameters have before the reservation.

* * * * *